(12) United States Patent
Im et al.

(10) Patent No.: US 12,541,217 B2
(45) Date of Patent: Feb. 3, 2026

(54) POWER MANAGEMENT DEVICE AND METHOD OF OPERATING THE SAME

(71) Applicant: ELECTRONICS AND TELECOMMUNICATIONS RESEARCH INSTITUTE, Daejeon (KR)

(72) Inventors: Jong Pil Im, Daejeon (KR); Seungeon Moon, Daejeon (KR); Jeong Hun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 242 days.

(21) Appl. No.: 18/412,938

(22) Filed: Jan. 15, 2024

(65) Prior Publication Data
US 2024/0241533 A1    Jul. 18, 2024

(30) Foreign Application Priority Data

Jan. 17, 2023 (KR) .................. 10-2023-0006561

(51) Int. Cl.
*G05F 1/67* (2006.01)
*G05F 1/46* (2006.01)
(Continued)

(52) U.S. Cl.
CPC ............... *G05F 1/67* (2013.01); *G05F 1/468* (2013.01); *G05F 1/62* (2013.01); *H02M 1/0025* (2021.05); *H02M 3/156* (2013.01)

(58) Field of Classification Search
CPC .. G05F 1/67; G05F 1/468; G05F 1/62; H02M 1/0025; H02M 3/156
See application file for complete search history.

(56) References Cited

U.S. PATENT DOCUMENTS 7,839,025 B2   11/2010  Besser et al.
11,251,653 B2   2/2022  Im et al.
(Continued)

OTHER PUBLICATIONS

Sungkyu Cho et al., "A Coreless Maximum Power Point Tracking Circuit of Thermoelectric Generators for Battery Charging Systems," IEEE, 2010.
(Continued)

*Primary Examiner* — Jue Zhang
*Assistant Examiner* — Lakaisha Jackson

(57) ABSTRACT

A power management device includes a converter, a sampling circuit, an MPPT management circuit, and an MPPT control circuit. The converter converts a voltage across an output node of an energy source, based on a first control signal to output a final output voltage; The sampling circuit includes a sampling node measures a sampling voltage related to an open circuit voltage of the energy source, based on a second control signal. The MPPT management circuit generates the first control signal, based on the second control signal, the sampling voltage, and the voltage across the output node of the energy source. The MPPT control circuit controls a voltage level of the sampling voltage to be changed within a first threshold voltage range by applying a current to the sampling node, based on the second control signal and the sampling voltage.

20 Claims, 13 Drawing Sheets

(51) Int. Cl.
G05F 1/62 (2006.01)
H02M 1/00 (2006.01)
H02M 3/156 (2006.01)

(56) References Cited

U.S. PATENT DOCUMENTS

2015/0112495 A1    4/2015  Kim et al.
2016/0079791 A1    3/2016  Kim et al.
2017/0134060 A1*  5/2017  Im .................... H04B 1/385
2017/0271873 A1*  9/2017  Huang ................ H02J 7/34
2018/0076646 A1*  3/2018  Lindsay .............. H02H 9/00

OTHER PUBLICATIONS

Yogesh K. Ramadass et al., "A Batteryless Thermoelectric Energy Harvesting Interface Circuit with 35mV Startup Voltage," IEEE, 2010.

"BQ25504 Ultra Low-Power Boost Converter With Battery Management for Energy Harvester Applications," Texas Instruments datasheet, 2011.

* cited by examiner

POWER MANAGEMENT DEVICE AND METHOD OF OPERATING THE SAME

CROSS-REFERENCE TO RELATED APPLICATION

This application claims priority under 35 U.S.C. § 119 to Korean Patent Application No. 10-2023-0006561 filed on Jan. 17, 2023, in the Korean Intellectual Property Office, the disclosures of which are incorporated by reference herein in their entireties.

BACKGROUND

Embodiments of the present disclosure described herein relate to a power management technology, and more particularly, to a power management device that reduces an influence exerted by a leakage current of internal capacitors and continuously tracks the maximum power point and a method of operating the power management device.

The power management device (or power conversion device) should transfer energy transferred from various kinds of energy sources to a load device as efficiently as possible. Recently, the power management device has been used in various environments for low power environment.

The power management device samples the open circuit voltage of a specific energy source to track the maximum power point and transfers energy, which is supplied from the energy source, to the load device, based on a sampling result. However, after one sampling, the voltage across a sampling node to track the maximum power point continuously decreases due to the leakage current generated from the internal capacitors. When the sampling is frequently performed to prevent the voltage across the sampling node from being continuously dropped, the energy is prevented from being transferred from the energy source to the load device during the sampling period, so the efficiency of the power management device is dropped.

SUMMARY

Embodiments of the present disclosure provide a power management device that reduces leakage currents of internal capacitors and the size of the internal capacitors, reduces the number of times of sampling, and continuously follows the maximum power point between one sampling operation and a sampling operation next to the one sampling operation.

Embodiments of the present disclosure provide a method of operating the power management device.

According to an embodiment, a power management device includes a converter, a sampling circuit, an MPPT management circuit, and an MPPT control circuit. The converter is connected to an output node of an energy source. The converter converts a voltage across the output node of the energy source, based on a first control signal, to output a final output voltage; The sampling circuit includes a sampling node connected to the output node of the energy source. The sampling node is for measuring a sampling voltage related to an open circuit voltage of the energy source, based on a second control signal. The MPPT management circuit generates the first control signal, based on the second control signal, the sampling voltage, and the voltage across the output node of the energy source. The MPPT control circuit controls a voltage level of the sampling voltage to be changed within a first threshold voltage range by applying a current to the sampling node, based on the second control signal and the sampling voltage.

According to an embodiment, in a method of operating a power management device, a voltage across an output node of an energy source is converted based on a first control signal, to output a final output voltage. The first control signal is output, based on a second control signal, a sampling voltage, and the voltage across the output node of the energy source. A voltage level of the sampling voltage is controlled to be changed within a first threshold voltage range by applying a current to a sampling node, based on the second control signal and the sampling voltage.

As described above, the power management device according to an embodiment of the present disclosure may control the level of a voltage across the sampling node (or a sampling voltage) to be changed (or maintained) near a voltage level (e.g., half of the open circuit voltage of the energy source, when the energy source is a thermoelectric element) corresponding to the maximum power point of the energy source. The internal capacitors included in the power management device may be connected between the sampling node (or the related node) and the ground voltage, and the power management device may control the voltage level across the sampling node, and may increase the sampling period at the sampling node (or reduce the number of times of sampling or the frequency of sampling) to reduce the size of the leakage current which may be caused from the internal capacitors and the size of the internal capacitors, thereby increasing the efficiency of the power management device.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described clearly and in detail such that those skilled in the art may easily implement the present disclosure.

Figure 1:
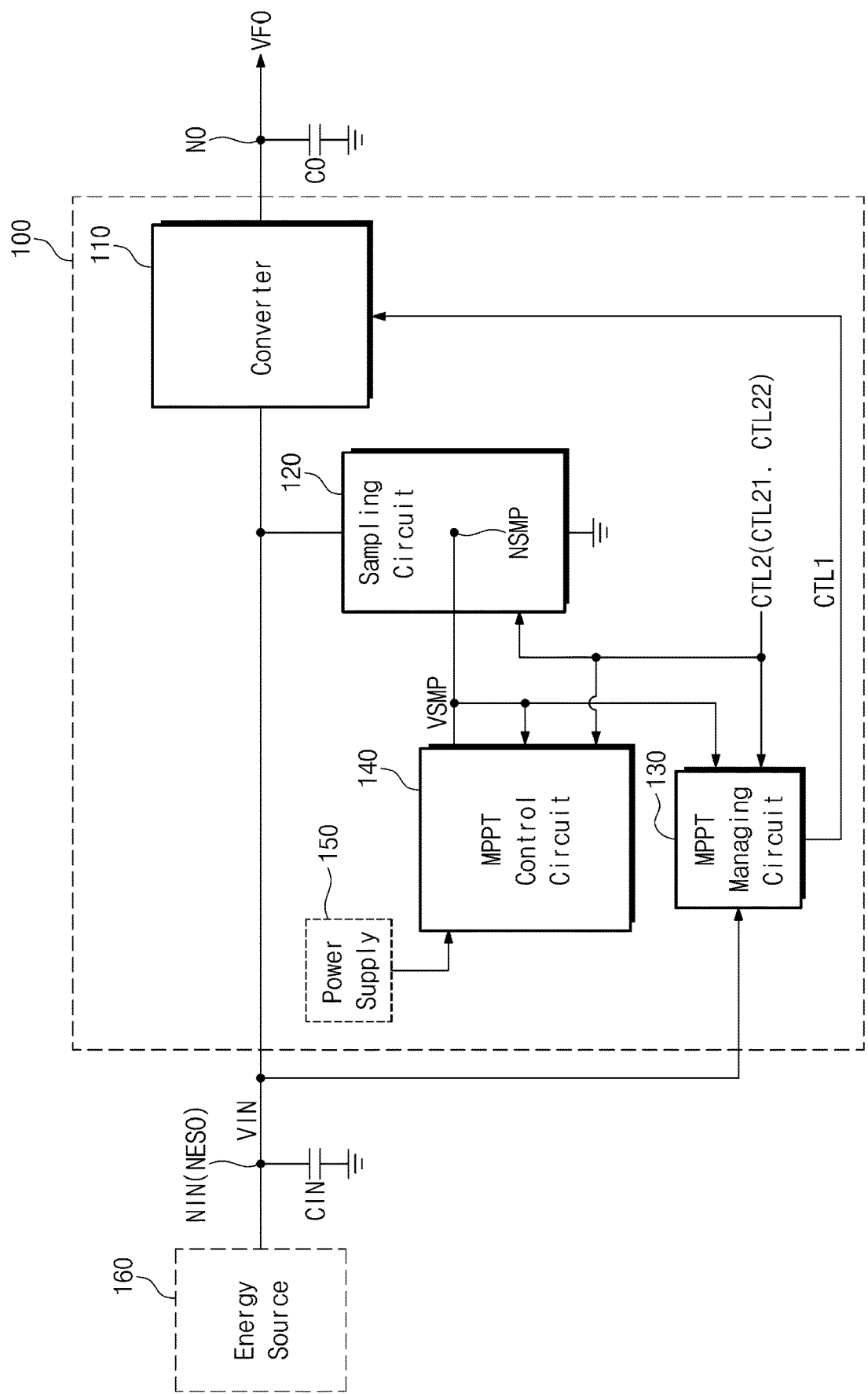
FIG. 1 is a block diagram illustrating a power management device according to an embodiment of the present disclosure.

FIG. 1 is a block diagram illustrating a power management device according to an embodiment of the present disclosure.

Referring to FIG. 1, a power management device 100 may include a converter 110, a sampling circuit 120, a maximum power point tracking (MPPT) management circuit 130, and an MPPT control circuit 140, and may further include a power supply 150.

According to an embodiment, the power management device 100 may include various energy management devices to preserve and manage energy received from an energy source 160 and to efficiently transmit the energy to a load device.

According to an embodiment, the energy source 160 may include non-renewable energy such as oil, natural gas, coal, and nuclear power, and renewable energy such as solar power, hydropower, wind power, geothermal power, and vibration.

The converter 110 is connected to an output node NESO of the energy source 160 and may convert a voltage across the output node NESO, based on a first control signal CTL1 and outputs a final output voltage VFO.

According to an embodiment, the converter 110 may include an AC/DC converter to convert an AC voltage into a DC voltage, and a DC/DC converter to convert a DC voltage into a DC voltage. For example, the converter 110 may include at least one of a transformer, a rectification circuit, or a smoothing circuit. For example, the converter 110 may include at least one of a buck converter, a boost converter, an inverting converter, or a buck-boost converter, which is provided only for the illustrative purpose.

According to an embodiment, the converter 110 may increase or decrease the level of the voltage across the output node NESO by adjusting the duty ratio of the converter 110 based on the first control signal CTL1. The details of the converter 110 will be described later with reference to FIG. 5

The sampling circuit 120 may include a sampling node NSMP connected to the output node NESO to detect a sampling voltage VSMP related to an open circuit voltage of the energy source 160 based on a second control signal CTL2.

According to an embodiment, the second control signal CTL2 may include sampling control signals having different logic levels, and the sampling circuit 120 may detect the sampling voltage VSMP by adjusting the level of the voltage across the sampling node NSMP based on the sampling control signals. The details of the sampling circuit 120 will be described later with reference to FIG. 3.

The MPPT management circuit 130 may generate the first control signal CTL1 based on the second control signal CTL2, the sampling voltage VSMP, and a voltage VIN across the output node NESO of the energy source 160.

According to an embodiment, the second control signal CTL2 may include management signals having different logic levels, and the MPPT management circuit 130 may output a comparison result obtained by comparing the voltage VIN across the output node NESO of the energy source 160 with the sampling voltage VSMP based on the management signals or may output a ground voltage. The details of the MPPT management circuit 130 will be described later with reference to FIG. 4.

The MPPT control circuit 140 may control the voltage level of the sampling voltage VSMP to be changed within a first threshold voltage range by applying a current to the sampling node NSMP based on the second control signal CTL2 and the sampling voltage VSMP.

According to an embodiment, the first threshold voltage range may include a voltage level corresponding to the maximum power point of the energy source 160, and may be individually set depending on the type and characteristics of the energy source 160.

For example, when the energy source 160 is a thermoelectric element, the first threshold voltage range may be set to include half of the open circuit voltage of the energy source 160, which is provided only for the illustrative purpose. When the energy source 160 is an energy source having a type or characteristic except for a thermoelectric element, the first threshold voltage range may be set to be different from half of the open circuit voltage.

For example, the first threshold voltage range may be defined by a first upper limit threshold voltage and a first lower limit threshold voltage. When the energy source 160 is the thermoelectric element, half of the open circuit voltage of the energy source 160 may be included between the first upper limit threshold voltage and the first lower limit threshold voltage.

According to an embodiment, the MPPT control circuit 140 may generate a plurality of reference voltages, and may generate selection result signals indicating the first threshold voltage range based on the sampling voltage VSMP and the plurality of reference voltages. The MPPT control circuit 140 may generate switch control signals based on the selection result signals, and may supply a current to the sampling node NSMP based on the switch control signal. The details of the MPPT control circuit 140 will be described later with reference to FIGS. 6, 7, and 8.

Through the above configuration, the power management device according to an embodiment of the present disclosure may control the voltage level at the sampling node (or sampling voltage) to be changed (or maintain) near a voltage level (e.g., half of the open circuit voltage of the energy source, when the energy source is the thermoelectric element) corresponding to the maximum power point of the energy source. The internal capacitors included in the power management device may be connected between the sampling node (or the related node) and a ground voltage, and the power management device may control the voltage level of the sampling node, and may increase the sampling period at the sampling node (or reduce the number of times of sampling or the frequency of sampling) to reduce the size of the leakage current which may be caused from the internal capacitors and the size of the internal capacitors, thereby increasing the efficiency of the power management device.

Figure 2:
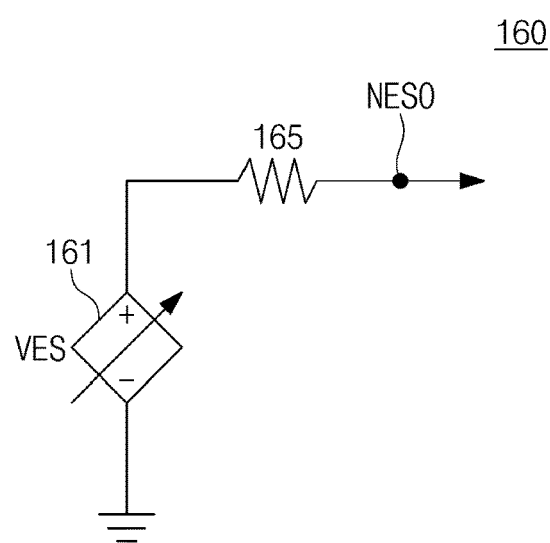
FIG. 2 is a circuit diagram illustrating an energy source of FIG. 1.

FIG. 2 is a circuit diagram illustrating the energy source of FIG. 1.

Referring to FIGS. 1 and 2, the energy source 160 may include a variable voltage source 161 and a resistor 165 connected in series. The variable voltage source 161 and the resistor 165 may be obtained by modeling the energy source 160 using an internal voltage source and an internal resistor, respectively.

According to an embodiment, the variable voltage source 161 may have a voltage level having a constant magnitude VES, and the voltage level of the variable voltage source 161 may be varied due to a change in the surrounding environment of the energy source 160. The variable voltage source 161 may transmit energy through the output node NESO of the energy source 160.

According to an embodiment, the energy source 160 may be electrically connected to the power management device 100. For example, the output node NESO of the energy source 160 may be an input node NIN of the power management device 100.

Figure 3:
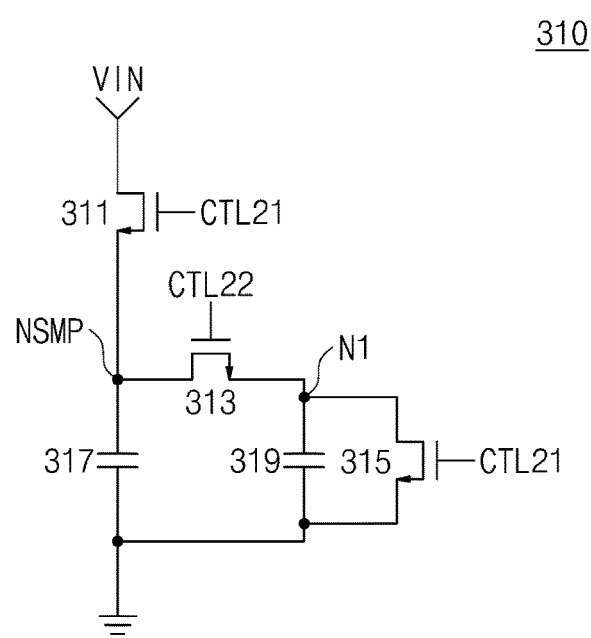
FIG. 3 is a circuit diagram illustrating a sampling circuit of FIG. 1 according to an embodiment.

FIG. 3 is a circuit diagram illustrating the sampling circuit of FIG. 1, according to an embodiment.

Referring to FIGS. 1, 2, and 3, a sampling circuit 310 may correspond to the sampling circuit 120 of FIG. 1. The sampling circuit 310 may include a first metal oxide semiconductor (MOS) transistor 311, a second MOS transistor 313, a third MOS transistor 315, a first capacitor 317, and a second capacitor 319.

The first MOS transistor 311 has a gate terminal to receive a first sampling control signal CTL21, and may be connected between the output node NESO (that is, the input node NIN of the power management device 100) of the energy source 160 and the sampling node NSMP.

The first capacitor 317 may be connected between the sampling node NSMP and a ground voltage.

The second MOS transistor 313 has a gate terminal to receive a second sampling control signal CTL22, and may be connected between the sampling node NSMP and the first node N1.

The second capacitor 319 may be connected between the first node N1 and the ground voltage.

The third MOS transistor 315 has a gate terminal to receive the first sampling control signal CTL21, and may be connected between the first node N1 and the ground voltage.

According to an embodiment, the sampling circuit 310 may include the sampling node NSMP connected to the output node NESO of the energy source 160 to detect the sampling voltage VSMP related to the open circuit voltage of the energy source 160, based on the second control signal CTL2.

According to an embodiment, the second control signal CTL2 may include a first sampling control signal CTL21 and a second sampling control signal CTL22.

According to an embodiment, the first MOS transistor 311 and the third MOS transistor 315 may be turned on during a first time duration and may be turned off during a second time duration after the first time duration. The second MOS transistor 313 may be turned off during the first time duration and may be turned on during the second time duration.

In this case, as the first MOS transistor 311 is turned on during the first time duration, the sampling node NSMP is directly connected to the output node NESO of the energy source 160, such that the level of the voltage across the sampling node NSMP may have a voltage level (e.g., VES) of the open circuit voltage of the energy source 160.

During the second time duration, as the first MOS transistor 311 is turned off, the sampling node NSMP may be disconnected from the output node NESO of the energy source 160. As the second MOS transistor 313 is turned on and the third MOS transistor 315 is turned off, the first capacitor 317 and the second capacitor 319 are connected in parallel to each other such that a magnitude of a synthetic capacitance between the sampling node NSMP and the ground voltage may increase, and the level of the voltage across the sampling node NSMP may be lower than the open circuit voltage of the energy source 160. For example, when the energy source 160 is a thermoelectric element, capacitances of the first capacitor 317 and the second capacitor 319 may be substantially equal to each other. During the second time duration, the level of the voltage across the sampling node NSMP may decrease up to the half of the open circuit voltage of the energy source 160, which is provided only for the illustrative purpose.

Figure 4:
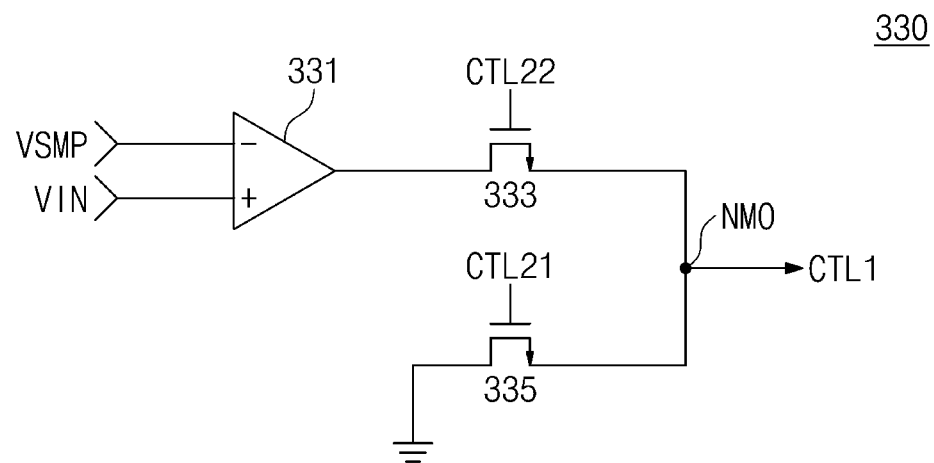
FIG. 4 is a circuit diagram illustrating a maximum power point tracking (MPPT) managing circuit of FIG. 1 according to an embodiment.

FIG. 4 is a circuit diagram illustrating the MPPT management circuit of FIG. 1 according to an embodiment.

Referring to FIGS. 1 and 4, the MPPT management circuit 330 may correspond to the MPPT management circuit 130 of FIG. 1. The MPPT management circuit 330 may include a comparator 331, a third MOS transistor 333, and a fourth MOS transistor 335.

The comparator 331 may be connected to the output node NESO of the energy source 160 and the sampling node NSMP, and may output a comparison result obtained by comparing the voltage of the output node NESO of the energy source 160 with the sampling voltage across the sampling node NSMP.

The third MOS transistor 333 has a gate terminal to receive the first management signal CTL22, and may be connected between the output terminal of the comparator 331 and an output node NMO of the MPPT management circuit 330.

The fourth MOS transistor 335 has a gate terminal to receive the second management signal CTL21, and may be connected between the ground voltage and the output node NMO of the MPPT management circuit 330.

According to an embodiment, the second control signal CTL2 may include a first management signal CTL22 and a second management signal CTL21.

According to an embodiment, the third MOS transistor 333 may be turned on during the first time duration, and may be turned off during the second time duration after the first time duration. The fourth MOS transistor 335 may be turned off during the first time duration, and may be turned on during the second time duration. In this case, the MPPT management circuit 330 may output the comparison result as the first control signal CTL1 during the first time duration, and may output the ground voltage as the first control signal CTL1 during the second time duration.

According to an embodiment, the first management signal CTL22 and the second management signal CTL21 may correspond to the second sampling control signal CTL22 and the first sampling control signal CTL21 described above with reference to FIG. 3, respectively.

Figure 5:
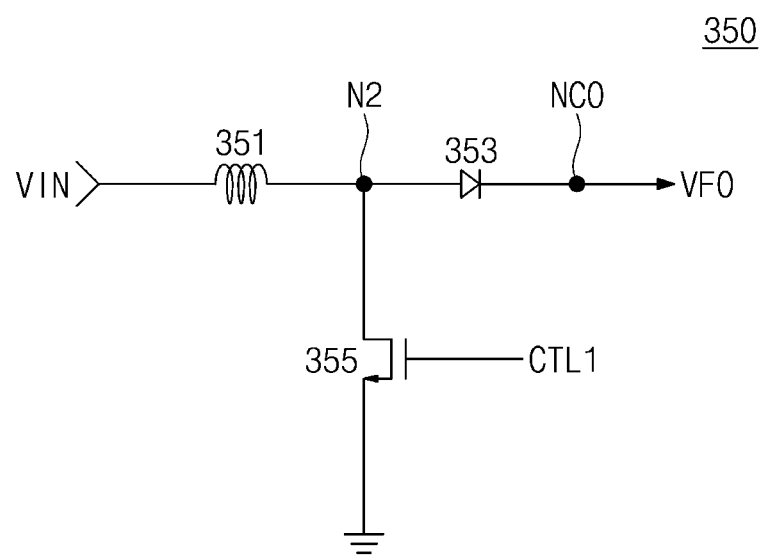
FIG. 5 is a circuit diagram illustrating the converter of FIG. 1.

FIG. 5 is a circuit diagram illustrating the converter of FIG. 1 according to an embodiment.

Referring to FIGS. 1 and 5, a converter 350 may correspond to the converter 110 of FIG. 1. The converter 350 may include an inductor 351, a fifth MOS transistor 355, and a diode 353.

The inductor 351 may be connected between the output node NESO of the energy source 160 and a second node N2.

The fifth MOS transistor 355 has a gate terminal to receive the first control signal CTL1 and may be connected between the second node N2 and the ground voltage.

The diode 353 may be connected between the second node N2 and an output node NCO of the converter 350.

According to an embodiment, the converter 350 may be implemented as a 'boost converter'. The converter 350 may increase or decrease the voltage level of the output node NCO by adjusting the duty ratio of the boost converter based on the first control signal CTL1. For example, when the voltage level of the output node NCO is lower than a target voltage, the converter 350 may increase the voltage level of the output node NCO for a predetermined period of time and wait until the voltage level of the output node NCO becomes lower than the target voltage again. The target voltage may be set to have a voltage level required by the load device connected to the output node NCO.

Figure 6:
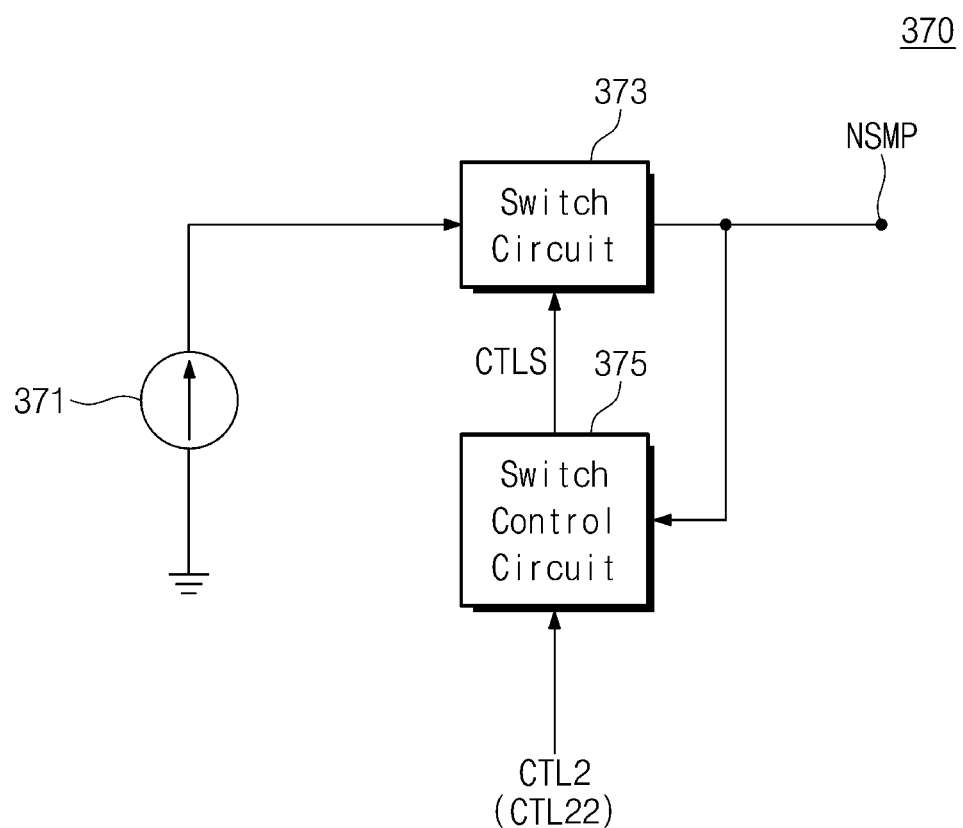
FIG. 6 is a block diagram illustrating an MPPT control circuit of FIG. 1 according to an embodiment.

FIG. 6 is a block diagram illustrating the MPPT control circuit of FIG. 1 according to an embodiment.

Referring to FIGS. 1 and 6, an MPPT control circuit 370 may correspond to the MPPT control circuit 140 of FIG. 1. The MPPT control circuit 370 may include a switch circuit 373 and a switch control circuit 375.

The switch circuit 373 may switch between a power supply 371 and the sampling node NSMP based on a switch control signal CTLS.

The switch control circuit 375 may generate the switch control signal CTLS based on the second control signal CTL2 and the sampling voltage VSMP across the sampling node NSMP.

According to an embodiment, the MPPT control circuit 370 may control the voltage level of the sampling voltage VSMP to be changed within the first threshold voltage range by applying a current to the sampling node NSMP based on the second control signal CTL2 and the sampling voltage VSMP.

According to an embodiment, the first threshold voltage range may include a voltage level corresponding to the maximum power point of the energy source 160, and may be individually set depending on the type and characteristics of the energy source 160. For example, when the energy source 160 is the thermoelectric element, the first threshold voltage range may be set to include the half of the open circuit voltage of the energy source 160, which is provided only for the illustrative purpose. For example, the first threshold voltage range may be defined by the first upper limit threshold voltage and the first lower limit threshold voltage, and a voltage level corresponding to the maximum power point of the energy source 160 may be included between the first upper limit threshold voltage and the first lower limit threshold voltage.

Figure 7:
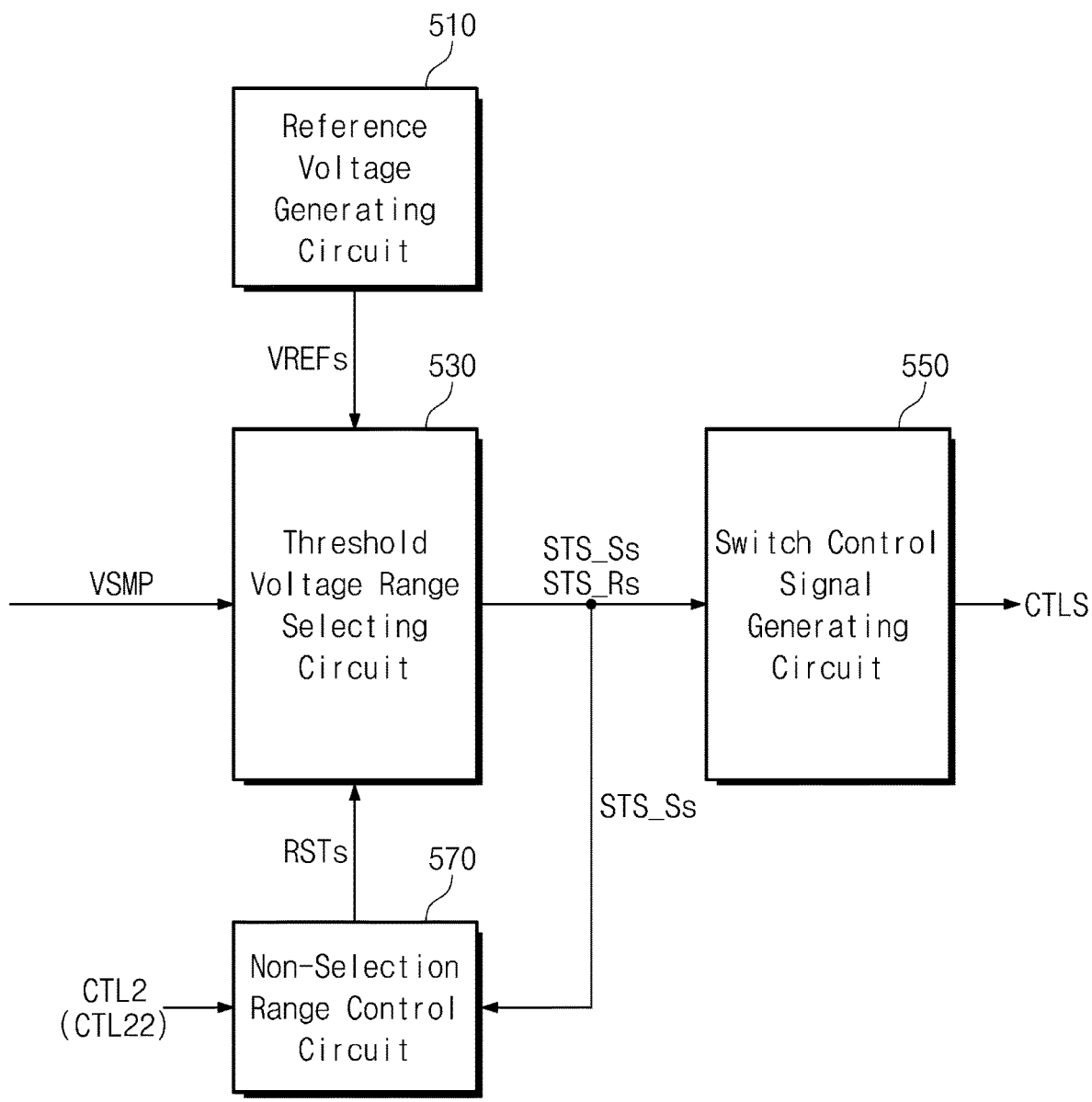
FIG. 7 is a block diagram illustrating a switch control circuit of FIG. 6 according to an embodiment.

FIG. 7 is a block diagram illustrating the switch control circuit of FIG. 6 according to an embodiment.

Referring to FIGS. 6 and 7, a switch control circuit 500 may correspond to the switch control circuit 375 of FIG. 6. The switch control circuit 500 may include a reference voltage generating circuit 510, a threshold voltage range selecting circuit 530, a switch control signal generating circuit 550, and a non-selection range managing circuit 570.

The reference voltage generating circuit 510 may generate a plurality of reference voltages VREFs.

The threshold voltage range selecting circuit 530 may output selection result signals STS_Ss and STS_Rs indicating the first threshold voltage range and the non-selection ranges based on the sampling voltage VSMP and the plurality of reference voltages VREFs.

The switch control signal generating circuit 550 may generate the switch control signal CTLS based on the selection result signals STS_Ss and STS_Rs.

The non-selection range managing circuit 570 may generate reset signals RSTs based on the second control signal CTL2 and the selection result signals STS_Ss, and output the reset signals RSTs to the threshold voltage range selecting circuit 530.

Figure 8:
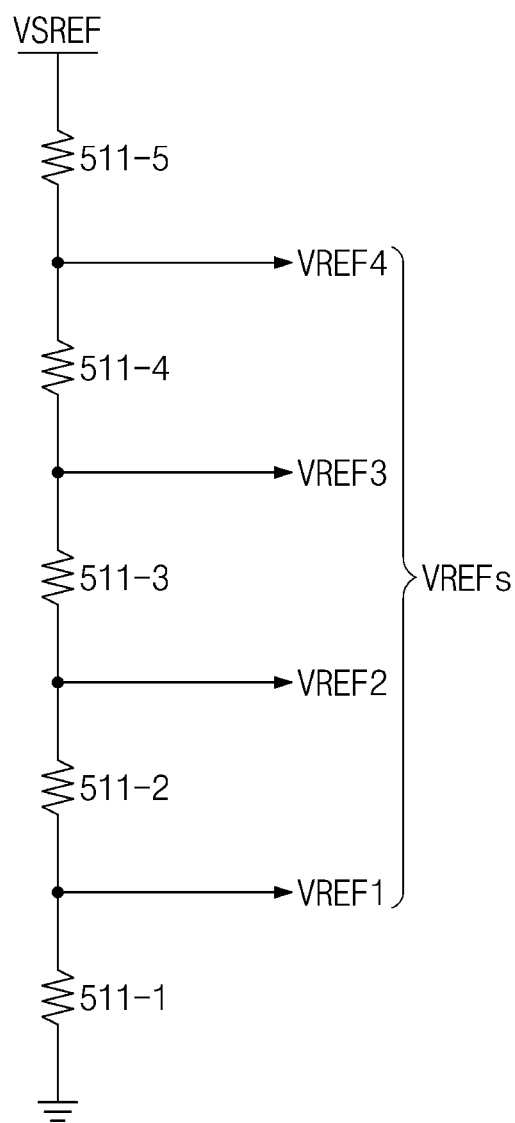
FIG. 8 is a circuit diagram illustrating a reference voltage generating circuit of FIG. 7 according to an embodiment.

FIG. 8 is a circuit diagram illustrating the reference voltage generating circuit of FIG. 7 according to an embodiment.

Referring to FIGS. 7 and 8, the reference voltage generating circuit 510 may include a resistance string in which resistors 511-1, 511-2, 511-3, 511-4, and 511-5 having preset sizes are connected in series between a power supply voltage VSREF and a ground voltage.

According to an embodiment, the reference voltage generating circuit 510 may generate a plurality of reference voltages VREFs based on the resistors 511-1 to 511-5, and define a plurality of threshold voltage ranges based on the plurality of reference voltages VREFs. For example, the plurality of reference voltages VREFs may include reference voltages VREF1, VREF2, VREF3, and VREF4, and the magnitudes of the resistors 511-1 to 511-5 may be substantially equal to each other. In this case, the reference voltage generating circuit 510 may define a range from the power supply voltage VSREF to the reference voltage VREF1 as one threshold voltage range, and define a range from the reference voltage VREF4 to the reference voltage VREF3 as another threshold voltage range. Similarly, the reference voltage generating circuit 510 may define a range from the reference voltage VREF3 to the reference voltage VREF2, a range from the reference voltage VREF2 to the reference voltage VREF1, and a range from the reference voltage VREF1 to the ground voltage as different threshold voltage ranges.

Although FIG. 8 illustrates that four reference voltages and five threshold voltage ranges are defined based on five resistors according to an embodiment, the present disclosure is provided only for the illustrative purpose. According to an embodiment, the reference voltage generating circuit 510 may define (N−1) reference voltages and N threshold voltage ranges, based on N resistors (in which N is an integer greater than or equal to two).

Figure 9:
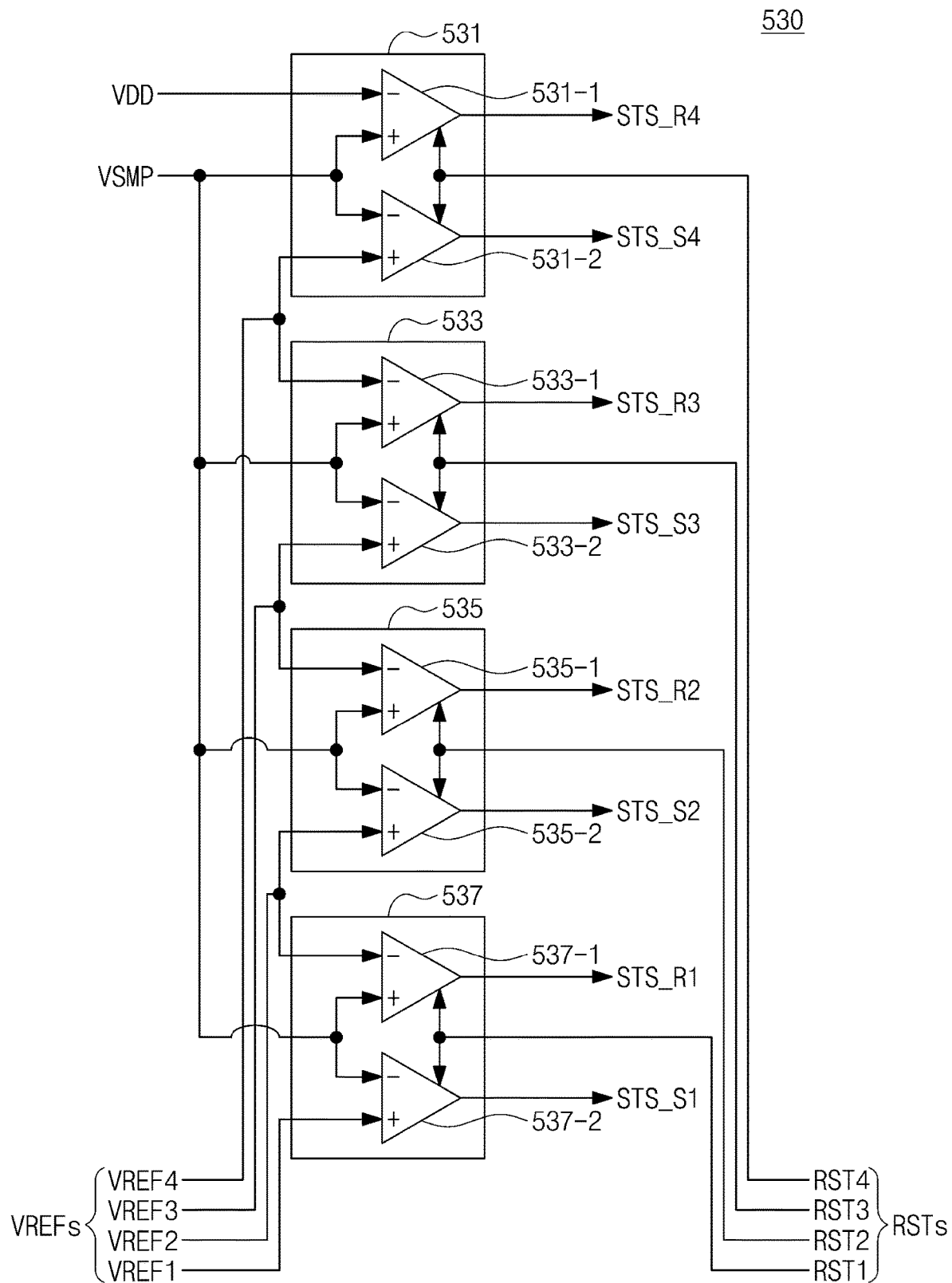
FIG. 9 is a circuit diagram illustrating a threshold voltage range selecting circuit of FIG. 7 according to an embodiment.
Figure 10:
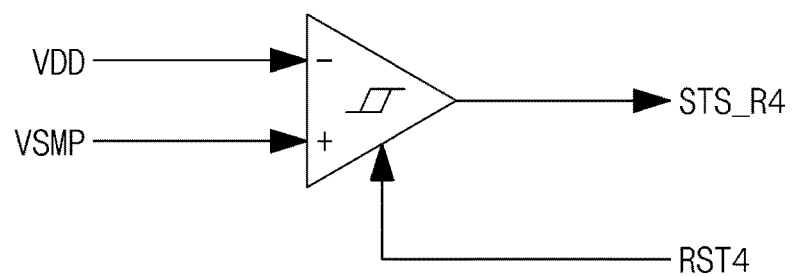
FIG. 10 is a block diagram illustrating a comparator included in a first selecting circuit of FIG. 9 according to an embodiment.

FIG. 9 is a circuit diagram illustrating a threshold voltage range selecting circuit of FIG. 7 according to an embodiment. FIG. 10 is a block diagram illustrating a comparator included in the first selecting circuit of FIG. 9 according to an embodiment.

Referring to FIGS. 7, 8, and 9, the threshold voltage range selecting circuit 530 may include a plurality of comparison circuits 531, 533, 535, and 537. The comparison circuit 531 may include comparators 531-1 and 531-2, and the comparison circuit 533 may include comparators 533-1 and 533-2. The comparison circuit 535 may include comparators 535-1 and 535-2, and the comparison circuit 537 may include comparators 537-1 and 537-2.

The comparison circuit 531 may receive a power supply voltage VDD, a sampling voltage VSMP, and a reference voltage VREF4. A comparator 531-1 may compare the power supply voltage VDD with the sampling voltage VSMP to output a comparison result STS_R4, and the comparator 531-2 may compare the sampling voltage VSMP with the reference voltage VREF4 to output a comparison result STS_S4. For example, when the voltage level of the sampling voltage VSMP is higher than the voltage level of the power supply voltage VDD, the comparison circuit 531 may output the comparison result STS_R4 having a first logic value (e.g., logic high) and the comparison result STS_S4 having a second logic value (e.g., logic low). When the voltage level of the sampling voltage VSMP is between the power supply voltage VDD and the reference voltage VREF4, the comparison circuit 531 may output comparison results STS_R4 and STS_S4 having the second logic value. When the voltage level of the sampling voltage VSMP is lower than the reference voltage VREF4, the comparison circuit 531 may output a comparison result STS_R4 having the second logic value and a comparison result STS_S4 having the first logic value. In a similar manner, the remaining comparison circuits 533, 535, and 537 may operate.

According to an embodiment, the threshold voltage range selecting circuit 530 may determine a threshold voltage range, which includes the sampling voltage VSMP, among the plurality of threshold voltage ranges, as the first threshold voltage range, based on the comparison results STS_S4, STS_S3, STS_R2, and STS_R1, and determine the remaining threshold voltage ranges except for the first threshold voltage range, as non-selection ranges. For example, when the voltage level of the sampling voltage VSMP falls between specific reference voltages, the comparison circuits 531, 533, 535, and 537 may output the specific comparison results STS_S4 to STS_S1, and STS_R4 to STS_R1. In this case, the threshold voltage range selecting circuit 530 may determine a range between specific reference voltages as the first threshold voltage range, and determine the remaining threshold voltage ranges except for the first threshold voltage range, as non-selection ranges. For example, when the sampling voltage VSMP is between the reference voltages VREF3 and VREF2, the comparison results STS_S4, STS_S3, and STS_R1 may represent first logic values, and the comparison results STS_R4, STS_R3, STS_R2, STS_S2, and STS_S1 may represent second logic value. When the comparison results STS_R4 to STS_R1, and STS_S4 to STS_S1 are output, the threshold voltage range selecting circuit 530 may determine a threshold voltage range indicating a range between the reference voltages VREF3 and VREF2 as the first threshold voltage range, and may determine a threshold voltage range indicating a voltage level higher than VREF3 and a voltage range indicating a voltage level lower than VREF2, as the non-selection ranges.

According to an embodiment, the threshold voltage range selecting circuit 530 may reset (or power off) comparators included in each of the comparison circuits 531, 533, 535, and 537 based on the reset signals RSTs. For example, the threshold voltage range selecting circuit 530 may reset the comparators 531-1 and 531-2 based on the reset signal RST4, reset the comparators 533-1 and 533-2 based on the reset signal RST3, reset the comparators 535-1 and 535-2 based on the reset signal RST2, and reset comparators 537-1 and 537-2, based on the reset signal RST1.

The threshold voltage range selecting circuit 530 may output the comparison results STS_S4 to STS_S1 as selection result signals STS_S, and output the comparison results STS_R4 to STS_R1 as selection result signals STS_Rs.

Referring to FIGS. 9 and 10, the comparator 531-1 may be implemented as a Schmidt-trigger comparator having hysteresis characteristics. For example, the comparator 531-1 may be implemented to be insensitive to external noise in a process of comparing the power supply voltage VDD with the sampling voltage VSMP, such that the comparator 531-1 stably outputs the comparison result STS_R4. The remaining comparators included in each of the comparison circuits 531, 533, 535, and 537 may also be implemented in the same manner as the comparator 531-1.

Figure 11:
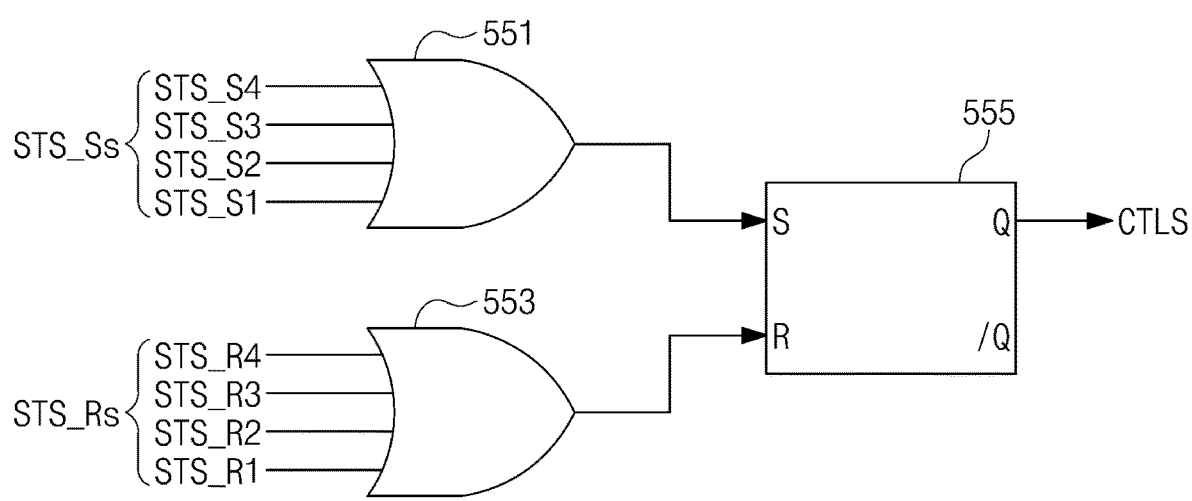
FIG. 11 is a block diagram illustrating a switch control signal generating circuit of FIG. 7 according to an embodiment.

FIG. 11 is a block diagram illustrating the switch control signal generating circuit of FIG. 7 according to an embodiment.

Referring to FIGS. 7 to 11, the switch control signal generating circuit 550 may include OR gates 551 and 553 and an SR latch 555.

The OR gate 551 may perform an OR operation on the selection result signals STS_Ss and output an OR operation result to a terminal S of the SR latch 555, and the OR gate 553 may perform an OR operation on the selection result signals STS_Rs and output an OR operation result to a terminal R of the SR latch 555.

The SR latch 555 may output the switch control signal CTLS for controlling the voltage level of the sampling voltage to be changed within the first threshold voltage range, based on the signals output from the OR gates 551 and 553.

According to an embodiment, the first threshold voltage range may be defined by a first upper limit threshold voltage range and a first lower limit threshold voltage range. The switch control signal CTLS may indicate the first logic value when the voltage level of the sampling voltage is less than or equal to the first lower limit threshold voltage.

Figure 12:
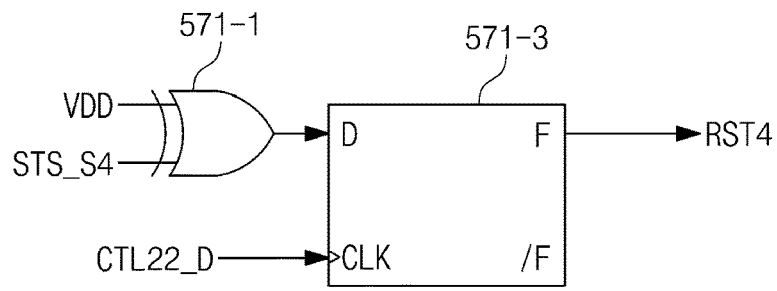
FIG. 12 is a block diagram illustrating an unselected range managing circuit of FIG. 7 according to an embodiment.
Figure 12:
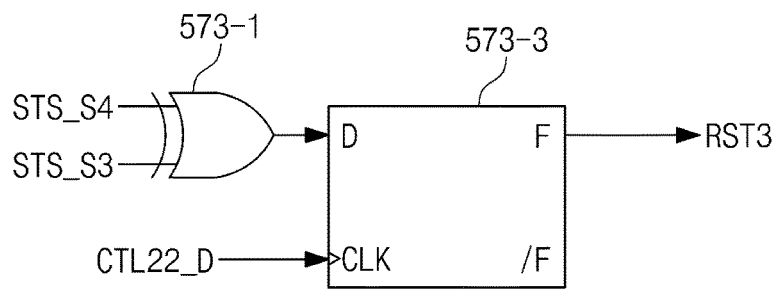
Figure 12:
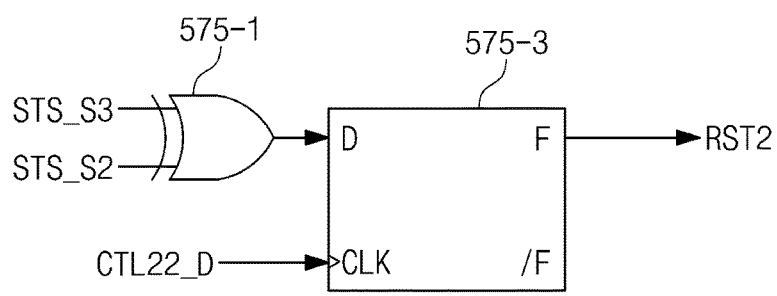
Figure 12:
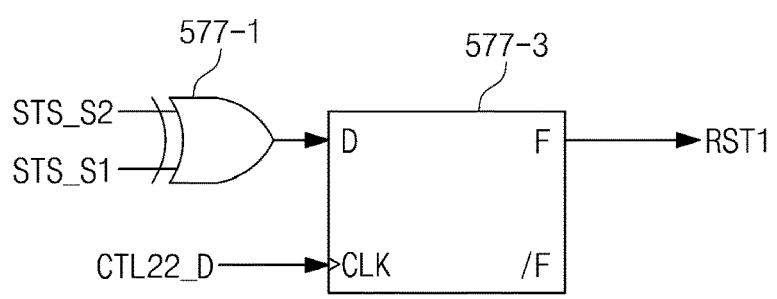
Figure 12:
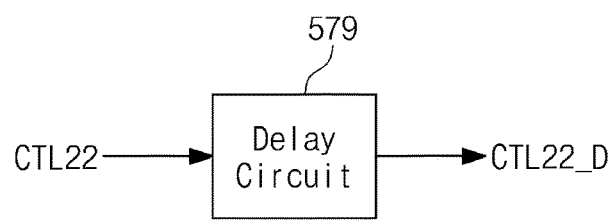

FIG. 12 is a block diagram illustrating the unselected range managing circuit of FIG. 7 according to an embodiment.

Referring to FIGS. 7 to 12, the non-selection range managing circuit 570 may include exclusive OR gates 571-1, 573-1, 575-1, and 577-1, D flip-flops 571-3, 575-3, and 577-3, and a delay circuit 579.

When the power supply voltage VDD and the selection result signal STS_S4 are different from each other, the exclusive OR gate 571-1 may output a result signal having the first logic value to a terminal D of the D flip-flop 571-3, and when the power supply voltage VDD and the selection result signal STS_S4 are equal to each other, a result signal having the second logic value may be output to the terminal D of the D flip-flop 571-3. The D flip-flop 571-3 may output a signal which input to the terminal D as a reset signal RST4 through a terminal F in synchronization with a delayed control signal CTL22_D. Similarly, the exclusive OR gates 573-1, 575-1, 577-1 and the D flip-flops 573-3, 575-3, and 577-3 may output reset signals RST1, RST2, and RST3 based on the selection result signals STS_S4, STS_S3, STS_S2, and STS_S1 and the delayed control signal CTL22_D.

The delay circuit 579 may delay the second sampling control signal CTL22 by a preset time to output the delayed control signal CTL22_D.

According to an embodiment, the selection result signals STS_S may be signals which are input to the terminal S of the SR latch (e.g., 555 of FIG. 11) through an OR gate (e.g., 551 of FIG. 11) to constitute the switch control signal CTLS. The switch control signal CTLS may be input to a switch circuit (e.g., 373 of FIG. 6) to control the voltage level of the sampling voltage VSMP to be changed within the first threshold voltage range. The reset signals RST4 to RST1 may be a signal for resetting (or powering off) the comparison circuits, which are not directly related to the first threshold voltage range, in the threshold voltage range selecting circuit 530 after starting the control for changing the voltage level of the sampling voltage VSMP within the first threshold voltage range. Accordingly, the delayed control signal CTL22_D may serve to delay a time point for generating the reset signals RST4 to RST1 by a specific time period (e.g., ΔTD) from the generation time of the selection result signals STS_S such that the reset signals RST4 to RST1 output to the threshold voltage range selecting circuit 530, after starting the control for the voltage level of the sampling voltage VSMP.

According to an embodiment, the non-selection range management circuit 570 may reset the comparison circuits corresponding to the non-selection ranges described above with reference to FIG. 9 based on the reset signals RST4 to RST1. For example, when the threshold voltage range selecting circuit 530 determines a range between the reference voltages VREF3 and VREF2 as the first threshold voltage range, the non-selection range management circuit 570 may reset comparison circuits (e.g., 531, 533, and 537 of FIG. 9) corresponding to the threshold voltage ranges (e.g., between the ground voltage and the reference voltage VREF1, or between the reference voltage VREF3 and the power supply voltage VDD).

Figure 13:
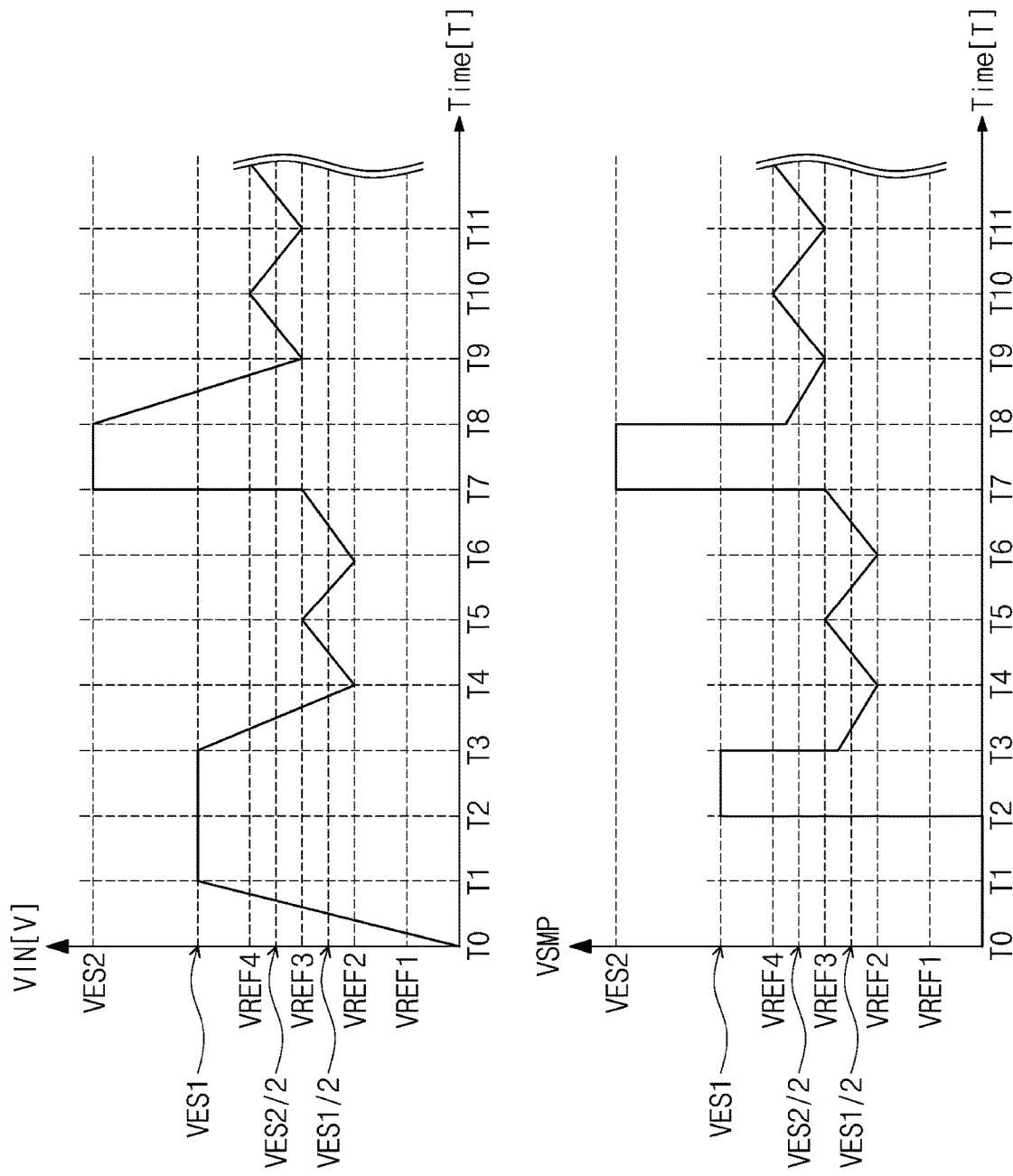
FIGS. 13, 14, and 15 are graphs to describe an operation of the power management device of FIG. 1.
Figure 14:
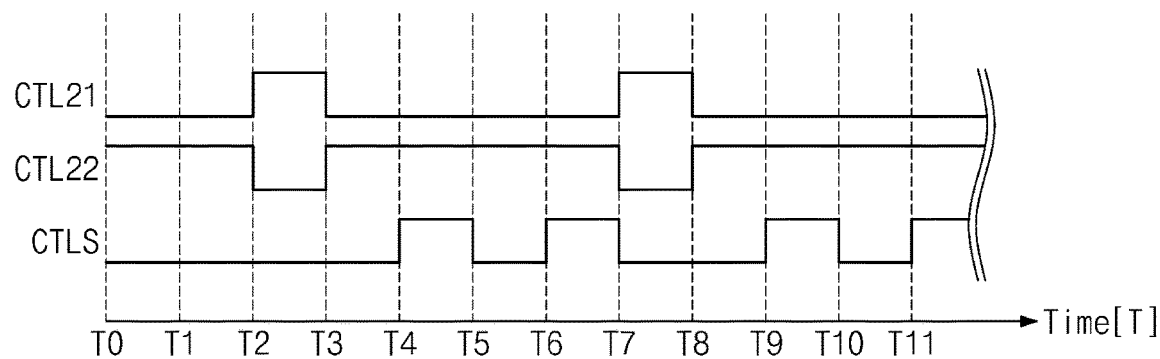
Figure 15:
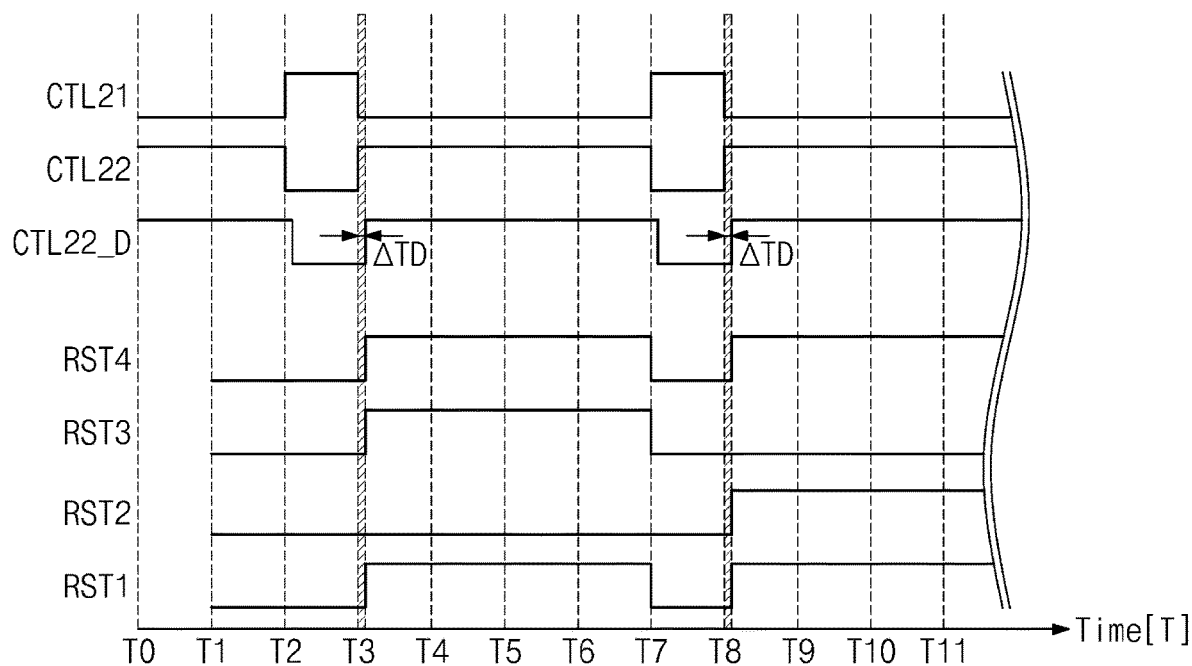

FIGS. 13, 14, and 15 are graphs for describing an operation of the power management device of FIG. 1.

FIGS. 13, 14, and 15 illustrate that control signals CTL21, CTL22, CTLS, and CLT22_D, the voltage VIN across the output node of the energy source, the sampling voltage VSMP across the sampling node, and reset signals RST1, RST2, RST3, and RST4, depending on T3, T4, T5, T6, T7, T8, T9, T10 and T11.

The control signal CTL21 may have the first logic value between the time points 2 and T3, and between the time points T7 and T8, and may have the second logic value for remaining time durations, that is, between the time points T0 and T2, between the time points T3 and T7, and between the time points T8 and T11. The control signal CTL22 may have a logic value different from a logic value of the control signal CTL21.

The switch control signal CTLS may have the first logic value between the time points T4 and T5, between the time points T6 and T7, between the time points T9 and T10, and after the time points T11 by the switch control signal generating circuit 550 described above with reference to FIG. 11.

The voltage VIN across the output node of the energy source rises to a voltage level (e.g., VES1) of the open circuit voltage of the energy source after the time point T0 and may be maintained at the raised voltage level between the time points T1 and T2.

Since the control signal CTL21 has the first logic value between the time points T2 and T3, the sampling voltage VSMP may indicate a voltage level (e.g., VES1). Since the control signal CTL21 has the first logic value and the control signal CTL22 has the second logic value between the time points T3 and T4, the sampling voltage VSMP may decrease to half (e.g., VES1/2) of the voltage level between the time points T2 and T3. In this case, the MPPT control circuit 370 may determine a voltage range including VES1/2 (e.g., VREF2 and VREF3) as the first threshold voltage range. The MPPT control circuit 370 may control the voltage level of the sampling voltage VSMP to be changed within the first threshold voltage range, based on the control signals CTL21 and CTL22. For example, the MPPT control circuit 370 may increase the voltage level of the sampling voltage VSMP when the voltage level of the sampling voltage VSMP is lower than the first lower threshold voltage (e.g., VREF2) included in the first threshold voltage range based on the control signal CTLS. Accordingly, the voltage level of the sampling voltage VSMP may be changed within the first threshold voltage range between the time points T3 and T7.

According to an embodiment, a magnitude of energy transferred by the energy source may be changed due to a change in the surrounding environment of the energy source. For example, before the time point T7, a voltage level of the open circuit voltage of the energy source may be changed from the voltage level VES1 to a voltage level VES2. In response to the change in the surrounding environment, the power management device 100 may re-sampling the sampling voltage VSMP based on the control signals CTL21 and CTL22. In this case, the level of the voltage VIN across the output node and the sampling voltage VSMP of the energy source may increase to the voltage level VES2 between the time points T7 and T8, and may decrease to half (VES2/2) of the voltage level VES2 between the time points T7 and T8. In this case, the MPPT control circuit 370 may determine a voltage range (e.g., VREF3 and VREF4) including VES2/2, as the first threshold voltage range. The MPPT control circuit 370 may control the voltage level of the sampling voltage VSMP to be changed within the first threshold voltage range based on the control signals CTL21 and CTL22. For example, the MPPT control circuit 370 may increase the voltage level of the sampling voltage VSMP, when the voltage level of the sampling voltage VSMP becomes lower than the first lower limit threshold voltage (e.g., VREF3) included in the first threshold voltage range, in response to the control signal CTLS. Therefore, the voltage level of the sampling voltage VSMP may be changed within the first threshold voltage range between the time points T9 and T11.

According to an embodiment, the remaining reset signals RST1, RST3, and RST4 except for the reset signal RST2 may have the first logic value, between the time points T3 and T7. In this case, the comparison circuits (e.g., reference numerals 531, 535, and 537 in FIG. 9) corresponding to reset signals RST1, RST3, and RST4 may be reset (or powered off), and only comparison circuits (e.g., reference numeral 533 in FIG. 9) corresponding to the first threshold voltage range may operate between the time points T3 and T7.

According to an embodiment, the remaining reset signals RST1, RST2, and RST4 except for the reset signal RST3 may have the first logic value between the time points T8 and T11. In this case, the comparison circuits (e.g., reference numerals 531, 533, and 537 of FIG. 9) corresponding to the reset signals RST1, RST2, and RST4 may be reset (or powered off), and only the comparison circuit (e.g., 535 of FIG. 9) corresponding to the first threshold voltage range may operate between the time points T8 and T11. Accordingly, power consumption caused in the power management device may be reduced by stopping the operations of the comparison circuits which are not directly related to the operations for the first threshold voltage range.

Figure 16:
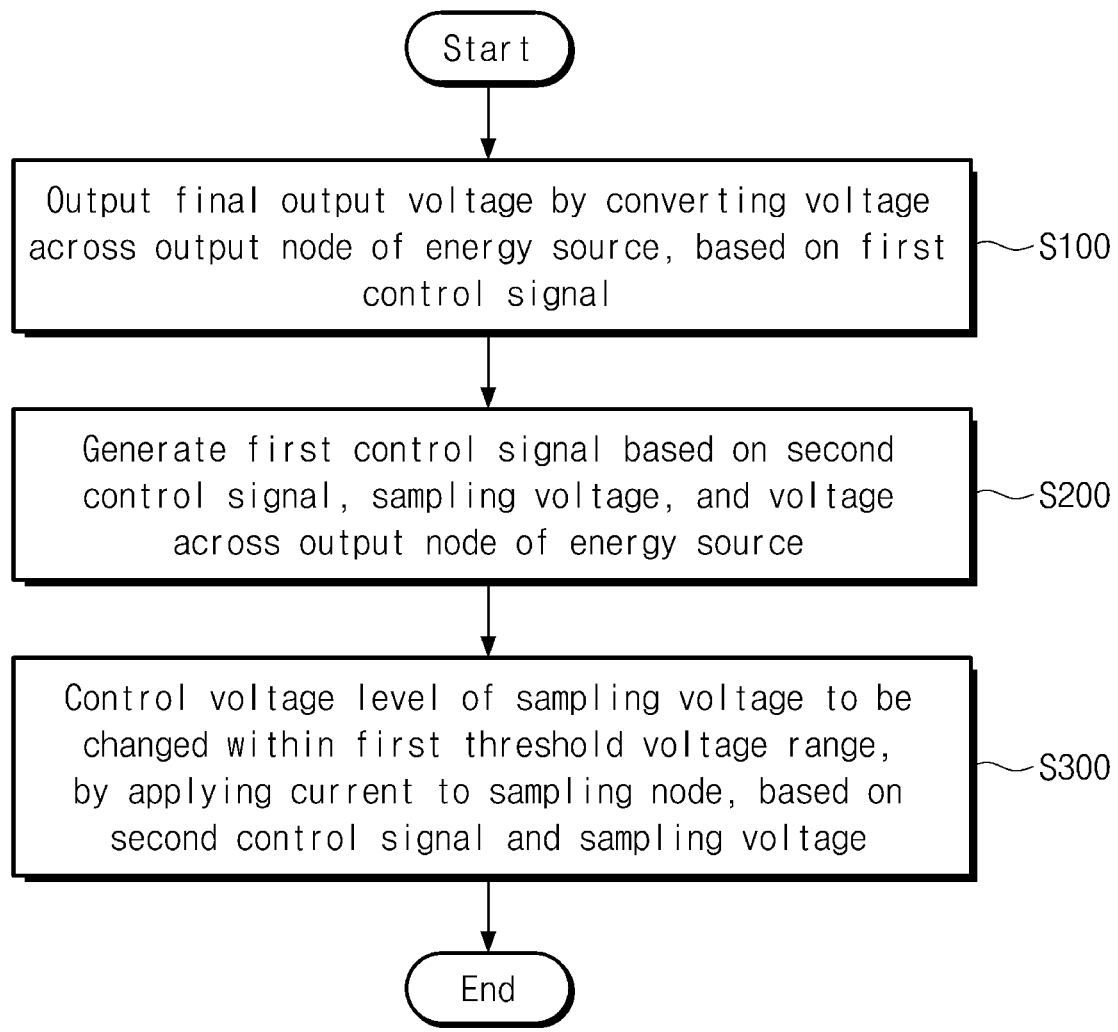
FIG. 16 is a flowchart illustrating a method of operating a power management device, according to an embodiment of the present disclosure.

FIG. 16 is a flowchart illustrating a method of operating a power management device, according to an embodiment of the present disclosure.

Referring to FIG. 16, the method of operating the power management device may be performed by the power management device 100 described above with reference to FIG. 1.

In the method of operating the power management device, the final output voltage may be output by converting the voltage across the output node of the energy source in response to the first control signal (S100).

The first control signal may be output based on the second control signal, the sampling voltage, and the voltage across the output node of the energy source (S200).

The voltage level of the sampling voltage may be controlled to be changed within the first threshold voltage range by applying the current to the sampling node, based on the second control signal and the sampling voltage (S300).

According to an embodiment, the first threshold voltage range may correspond to the maximum power point of the energy source and may include half of the open circuit voltage of the energy source.

According to an embodiment, in the step S300, the plurality of reference voltages may be generated. Selection result signals indicating the first threshold voltage range and the non-selection ranges may be output based on the sampling voltage and the plurality of reference voltages. The switch control signal for controlling the voltage level of the sampling voltage to be changed within the first threshold voltage range may be outputted based on the selection result signals.

According to an embodiment, in the S300, the plurality of threshold voltage ranges may be defined based on the plurality of reference voltages. Among the plurality of threshold voltage ranges, a threshold voltage range including the sampling voltage may be determined as the first threshold voltage range. Remaining threshold voltage ranges except for the first threshold voltage range, among the plurality of threshold voltage ranges may be determined as the non-selected ranges.

According to an embodiment, the first threshold voltage range may be defined by the first upper limit threshold voltage and the first lower limit threshold voltage. The switch control signal may indicate the first logic value when the voltage level of the sampling voltage is equal to or less than the first lower limit threshold voltage, and may indicate a second logic value when the voltage level of the sampling voltage is equal to or greater than the first upper limit threshold voltage.

According to an embodiment, in the S200, a comparison result may be generated by comparing the voltage across the output node of the energy source and the sampling voltage. One of the comparison result and the ground voltage may be generated as the first control signal, based on the second control signal.

Figure 17:
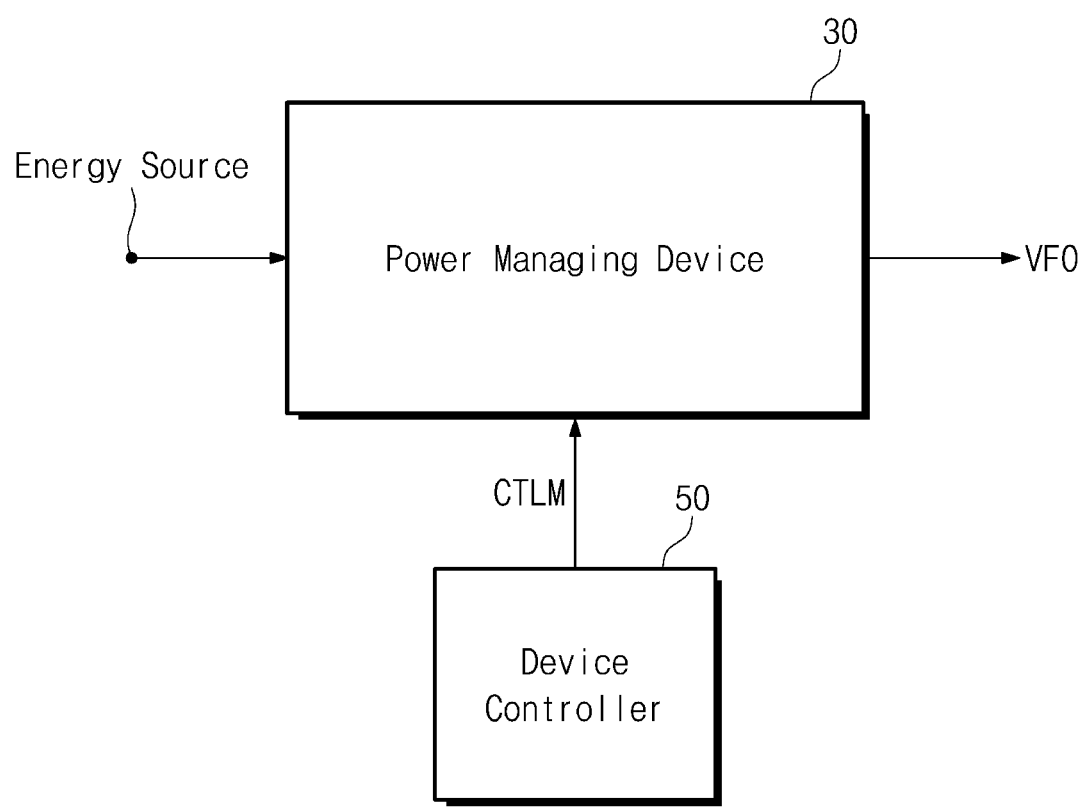
FIG. 17 is a block diagram illustrating a power management system including a power management device according to an embodiment of the present disclosure.

FIG. 17 is a block diagram illustrating a power management system including the power management device according to an embodiment of the present disclosure.

Referring to FIG. 13, a power management system 10 may include a power management device 30 and a device controller 50.

The power management system 10 may be an energy harvesting system to finely harvest energy generated from a natural energy source, such as sunlight, vibration, heat, and wind power, and convert the harvested energy into electrical energy. According to an embodiment, the power management system 10 may be mainly used in low-power devices, such as a wireless network or small electronic device of an automobile, a mobile device, and a wearable device.

The power management device 30 may be connected to an output node of the energy source and may convert the voltage across the output node in response to a control signal CTLM to output a final output voltage. The power management device 30 may detect a sampling voltage related the an open circuit voltage of the energy source, in response to the control signal CTLM, and control the voltage level of the sampling voltage to be changed within the first threshold voltage range, based on the control signal CTLM and the sampling voltage.

The device controller 50 may provide the control signal CTLM to control the power management device 30 to the power management device 30.

According to an embodiment, the control signal CTLM may correspond to the control signal CTL2 described above with reference to FIG. 1.

As described above, the power management device 100 according to an embodiment of the present disclosure may control the level of a voltage across the sampling node (or a sampling voltage) to be changed (or maintained) near a voltage level (e.g., half of the open circuit voltage of the energy source, when the energy source is a thermoelectric element) corresponding to the maximum power point of the energy source. The internal capacitors included in the power management device may be connected between the sampling node (or the related node) and the ground voltage, and the power management device may control the voltage level across the sampling node, and may increase the sampling period at the sampling node (or reduce the number of times of sampling or the frequency of sampling) to reduce the size of the leakage current which may be caused from the internal capacitors and the size of the internal capacitors, thereby increasing the efficiency of the power management device.

The above description refers to detailed embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. Accordingly, the scope of the present disclosure is not limited to the above-described embodiments, but defined by following claims and equivalents thereof.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A power management device comprising:
   a converter connected to an output node of an energy source, and configured to convert a voltage across the output node of the energy source, based on a first control signal, to output a final output voltage;
   a sampling circuit including a sampling node connected to the output node of the energy source, the sampling node being for measuring a sampling voltage related to an open circuit voltage of the energy source, based on a second control signal;
   a maximum power point tracking (MPPT) management circuit configured to generate the first control signal, based on the second control signal, the sampling voltage, and the voltage across the output node of the energy source; and
   an MPPT control circuit configured to control a voltage level of the sampling voltage to be changed within a first threshold voltage range by applying a current to the sampling node, based on the second control signal and the sampling voltage.

2. The power management device of claim 1, wherein the first threshold voltage range corresponds to a maximum power point of the energy source and half of the open circuit voltage of the energy source.

3. The power management device of claim 1, wherein the MPPT control circuit includes:
   a switch circuit configured to switch between a power supply and the sampling node, based on a switch control signal; and
   a switch control circuit configured to generate the switch control signal based on the second control signal and the sampling voltage.

4. The power management device of claim 3, wherein the switch control circuit includes:
   a reference voltage generating circuit configured to generate a plurality of reference voltages;
   a threshold voltage range selecting circuit configured to output selection result signals indicating the first threshold voltage range and non-selection ranges, based on the sampling voltage and the plurality of reference voltages; and a switch control signal generating circuit configured to generate the switch control signal, based on the selection result signals.

5. The power management device of claim 4, wherein the switch control circuit includes a non-selection range managing circuit that generates reset signals, based on selection result signals indicating the second control signal and the non-selection ranges, and
outputs the reset signals to the threshold voltage range selecting circuit.

6. The power management device of claim 5, wherein the reference voltage generating circuit defines a plurality of threshold voltage ranges, based on the plurality of reference voltages,
wherein the threshold voltage range selecting circuit determines a threshold voltage range, which includes the sampling voltage, among the plurality of threshold voltage ranges, as the first threshold voltage range, and
wherein the switch control signal generating circuit outputs a switch control signal for controlling a voltage level of the sampling voltage to be changed within the first threshold voltage range.

7. The power management device of claim 6, wherein the threshold voltage range selecting circuit determines remaining threshold voltage ranges among the plurality of threshold voltage ranges except for the first threshold voltage range, as the non-selection ranges.

8. The power management device of claim 6, wherein the first threshold voltage range is defined by a first upper limit threshold voltage and a first lower limit threshold voltage, and
wherein the switch control signal indicates a first logic value, when a voltage level of the sampling voltage is equal to or less than the first lower limit threshold voltage, and indicates a second logic value, when the voltage level of the sampling voltage is equal to or greater than the first upper limit threshold voltage.

9. The power management device of claim 8, wherein the switch circuit is turned on when the switch control signal indicates the first logic value, and turned off when the switch control signal indicates the second logic value.

10. The power management device of claim 1, wherein the MPPT management circuit includes:
a comparator configured to output a comparison result obtained by comparing the voltage across the output node of the energy source with the sampling voltage;
a first MOS transistor having a gate terminal to receive a first management signal, and connected between an output terminal of the comparator and an output node of the MPPT management circuit; and
a second MOS transistor having a gate terminal to receive a second management signal, and connected between a ground voltage and the output node of the MPPT management circuit, and
wherein the second control signal includes:
a first management signal and a second management signal.

11. The power management device of claim 10, wherein the first MOS transistor is turned on during a first time duration, and turned off during a second time duration after the first time duration,
wherein the second MOS transistor is turned off during the first time duration and turned on during the second time duration, and
wherein the MPPT management circuit outputs the comparison result as the first control signal during the first time duration, and outputs the ground voltage as the first control signal during the second time duration.

12. The power management device of claim 11, wherein the sampling circuit includes:
a first MOS transistor having a gate terminal to receive a first sampling control signal and connected between the output node of the energy source and the sampling node;
a first capacitor connected between the sampling node and the ground voltage;
a second MOS transistor having a gate terminal to receive a second sampling control signal and connected between the sampling node and a first node;
a second capacitor connected between the first node and the ground voltage; and
a third MOS transistor having a gate terminal to receive the first sampling control signal and connected between the first node and the ground voltage, and
wherein the second control signal includes:
the first sampling control signal and the second sampling control signal.

13. The power management device of claim 12, wherein the first MOS transistor and the third MOS transistor are turned on during the first time duration and turned off during the second time duration after the first time duration,
wherein the second MOS transistor is turned off during the first time duration and turned on during the second time duration, and
wherein the sampling voltage indicates an open circuit voltage of the energy source during the first time duration, and decreases to half of the open circuit voltage of the energy source during the second time duration.

14. The power management device of claim 1, wherein the converter includes:
an inverter connected between an output node of the energy source and a first node;
a MOS transistor having a gate terminal to receive the first control signal, and connected between the first node and a ground voltage; and
a diode connected between the first node and the output node of the converter.

15. A method of operating a power management device, the method comprising:
converting a voltage across an output node of an energy source, based on a first control signal, and outputting a final output voltage;
outputting the first control signal, based on a second control signal, a sampling voltage, and the voltage across the output node of the energy source; and
controlling a voltage level of the sampling voltage to be changed within a first threshold voltage range by applying a current to a sampling node, based on the second control signal and the sampling voltage.

16. The method of claim 15, wherein the first threshold voltage range corresponds to a maximum power point of the energy source and includes half of the open circuit voltage of the energy source.

17. The method of claim 15, wherein the controlling of the voltage level of the sampling voltage to be changed within the first threshold voltage range includes:
generating a plurality of reference voltages;
outputting selection result signals indicating the first threshold voltage range and non-selection ranges, based on the sampling voltage and the plurality of reference voltages; and outputting a switch control signal for controlling a voltage level of the sampling voltage to be changed within the first threshold voltage rang, based on the selection result signals.

18. The method of claim 17, wherein the controlling of the voltage level of the sampling voltage to be changed within the first threshold voltage range includes:

defining a plurality of threshold voltage ranges, based on the plurality of reference voltages;

determining a threshold voltage range, which includes the sampling voltage, among the plurality of threshold voltage ranges, as the first threshold voltage range; and determining remaining threshold voltage ranges among the plurality of threshold voltage ranges, except for the first threshold voltage range, as the non-selection ranges.

19. The method of claim 18, wherein the first threshold voltage range is defined by a first upper limit threshold voltage and a first lower limit threshold voltage, and wherein the switch control signal indicates a first logic value, when a voltage level of the sampling voltage is equal to or less than the first lower limit threshold voltage, and indicates a second logic value, when the voltage level of the sampling voltage is equal to or greater than the first upper limit threshold voltage.

20. The method of claim 15, wherein the generating of the first control signal includes:

generating a comparison result obtained by comparing the voltage across the output node of the energy source with the sampling voltage; and generating one of the comparison result and the ground voltage as the first control signal, based on the second control signal.

* * * * *